United States Patent
Yang (10) Patent No.: US 12,214,759 B2
(45) Date of Patent: Feb. 4, 2025

(54) COMPRESSOR COOLING SYSTEM FOR CLEANING A VEHICLE SENSOR

(71) Applicants: HYUNDAI MOTOR COMPANY, Seoul (KR); KIA CORPORATION, Seoul (KR)

(72) Inventor: Young Dug Yang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 301 days.

(21) Appl. No.: 17/985,580

(22) Filed: Nov. 11, 2022

(65) Prior Publication Data
US 2023/0227007 A1   Jul. 20, 2023

(30) Foreign Application Priority Data
Jan. 20, 2022   (KR) .................. 10-2022-0008256

(51) Int. Cl.
*B60S 1/56* (2006.01)
*B60S 1/54* (2006.01)

(52) U.S. Cl.
CPC .. *B60S 1/56* (2013.01); *B60S 1/54* (2013.01)

(58) Field of Classification Search
CPC .... B60S 1/54; B60S 1/56; B60S 1/483; B60S 1/0848; F04D 25/082; F04D 29/5806; G02B 27/0006; B62D 25/081; F25B 31/006; F25B 31/008
See application file for complete search history.

(56) References Cited

U.S. PATENT DOCUMENTS

| | | | | |
|---|---|---|---|---|
| 4,206,805 A | * | 6/1980 | Beckett | F04B 39/06 165/169 |
| 4,250,717 A | * | 2/1981 | Stone | F25B 31/006 62/305 |
| 4,680,939 A | * | 7/1987 | Rojey | F25B 9/006 62/505 |
| 5,140,234 A | * | 8/1992 | Wallrafen | B60S 1/0818 318/264 |
| 5,261,254 A | * | 11/1993 | Cattane | B60H 1/32331 15/250.1 |
| 5,304,936 A | * | 4/1994 | Buschur | B60S 1/0822 73/304 C |
| 5,407,091 A | * | 4/1995 | Wallis | E03B 3/03 220/501 |
| 5,561,882 A | * | 10/1996 | Eustache | B60S 1/50 15/250.04 |
| 5,657,929 A | * | 8/1997 | DeWitt | B60S 1/52 239/284.2 |

(Continued)

*Primary Examiner* — Travis Ruby
(74) *Attorney, Agent, or Firm* — Lempia Summerfield Katz LLC (57) ABSTRACT

Proposed is a compressor cooling system for cleaning a vehicle sensor, the system including: a rainwater sensor unit provided on a front window of a vehicle for detecting rainwater; a rainwater collection unit for collecting the rainwater flowing down to under the front window; a water pump unit connected to the rainwater collection unit for discharging the collected rainwater to an air compressor; and an air compressor cooling unit combined with the air compressor and having an inlet flow path and an outlet flow path inside, the discharged rainwater cooling the air compressor while flowing through the inlet flow path and the outlet flow path.

11 Claims, 5 Drawing Sheets

(56) References Cited

U.S. PATENT DOCUMENTS

| | | | | |
|---|---|---|---|---|
| 5,669,986 A * | 9/1997 | Buchanan, Jr. | ............ | B60S 1/50 |
| | | | | 15/103 |
| 5,694,780 A * | 12/1997 | Alsenz | ................. | F04B 39/064 |
| | | | | 62/505 |
| 5,797,159 A * | 8/1998 | Berge | ........................ | B60S 1/50 |
| | | | | 15/250.31 |
| 5,946,763 A * | 9/1999 | Egner-Walter | ............ | B60S 1/50 |
| | | | | 15/250.02 |
| 6,266,842 B1 * | 7/2001 | Muller | ..................... | B60S 1/50 |
| | | | | 239/303 |
| 10,012,133 B1 * | 7/2018 | Martin | ................. | F01P 11/0204 |
| 10,150,453 B2 * | 12/2018 | Busiello | ............. | B01D 21/0045 |
| 10,696,277 B1 * | 6/2020 | Rakouki | ................... | B60S 1/56 |
| 11,273,798 B2 * | 3/2022 | Giraud | ................. | B60S 1/0848 |
| 12,115,946 B2 * | 10/2024 | Carroll | .................... | C02F 1/001 |
| 2006/0244288 A1 * | 11/2006 | Sandhu | ................ | B62D 25/081 |
| | | | | 296/192 |
| 2008/0201888 A1 * | 8/2008 | Nakai | ........................ | A47L 1/00 |
| | | | | 15/250.001 |
| 2013/0206266 A1 * | 8/2013 | Stenhouse | ................. | B60S 1/50 |
| | | | | 137/899.4 |
| 2015/0023818 A1 * | 1/2015 | Lin | ........................ | F04B 53/08 |
| | | | | 417/372 |
| 2015/0308456 A1 * | 10/2015 | Thompson | .............. | F04D 17/12 |
| | | | | 417/244 |
| 2019/0106086 A1 * | 4/2019 | Giraud | .................. | B60S 1/0848 |
| 2019/0291666 A1 * | 9/2019 | Martin | ................. | B60H 1/3233 |
| 2020/0149583 A1 * | 5/2020 | Lee | .......................... | F04D 17/10 |
| 2024/0125334 A1 * | 4/2024 | Choi | ........................ | F04D 25/06 |

\* cited by examiner

COMPRESSOR COOLING SYSTEM FOR CLEANING A VEHICLE SENSOR

CROSS-REFERENCE TO RELATED APPLICATION

This application claims under 35 U.S.C. § 119(a) the benefit of priority to Korean Patent Application No. 10-2022-0008256 filed on Jan. 20, 2022, the entire contents of which are incorporated herein by reference.

BACKGROUND

(a) Field of the Disclosure

The present disclosure relates to a compressor cooling system for cleaning a vehicle sensor and, more particularly, to a compressor cooling system for cleaning a vehicle sensor, the system being capable of cooling a compressor to clean a sensor by utilizing rainwater collected when a wiper is driven, without being equipped with a separate coolant tank.

(b) Background Art

Usually, an optical detection system is a name given to any system including a plurality of cameras and laser sensors (commonly referred to as LIDARs) or other optical sensors that operate based on emission or detection of spectrum light, particularly, infrared light that is visible or invisible to the human eye.

There is an increasing number of vehicles that adopt this type of optical detection system in order to assist a driver in predetermined driving situations, such as a parking situation.

The optical detection system for parking assistance needs to supply as high-quality data as possible in order to provide as effective parking assistance as possible. Accordingly, the optical detection system is required to maintain a clean state to acquire such data.

To this end, as known in the related art, a cleaning apparatus is mounted in the vicinity of the optical sensor. The cleaning apparatus is configured to eject cleaning liquid or air immediately before performing detection by the optical detection system.

Since the optical sensor is not within a driver's field of vision, the optical sensor is set to be automatically cleaned with a predetermined period. However, a cleaning operation may be performed at the improper time and, more specifically, may be performed at the improper time in a specific driving situation.

For example, at the moment when the driver begins to bring his/her vehicle to a stop for parking or to select reverse gear, an operation of cleaning a camera lens for parking assistance may be unsuitably performed. This cleaning operation may cause only trouble or inconvenience during parking. For instance, the operation of cleaning may lead to a vehicle accident in an unexpected situation, depending on which sensor the operation of cleaning is performed for.

Moreover, when the operation of cleaning is automatically triggered while the vehicle travels at a high speed, cleaning liquid drops may cover a portion of the driver's field of vision and thus may distract the driver from driving his/her vehicle, leading to accident risk.

In addition, when the operation of cleaning is continually performed for a long time while the vehicle travels, temperature of a compressor that ejects a fluid or air for cleaning is increased. The disadvantage is that in a situation where the operation of cleaning is necessary, driving/operation of the compressor may be limited.

The above information disclosed in this Background section is only for enhancement of understanding of the background of the disclosure and accordingly it may include information that does not form the prior art that is already known to a person of ordinary skill in the art.

SUMMARY

The present disclosure has been made in efforts to solve the above problem, and an object of the present disclosure is to provide a compressor cooling system for cleaning a vehicle sensor, the system being capable of operating a water pump using a rain sensor used to drive (i.e., operate) a wiper in rainy weather and of selectively cooling an air compressor for cleaning a sensor by utilizing rainwater collected by operating the water pump. With this compressor cooling system, driving of the water pump is controlled by utilizing a rain sensor in the related art, without additionally providing a separate sensor for driving the water pump.

According to an aspect of the present disclosure, there is provided a compressor cooling system for cleaning a vehicle sensor, the system including: a rainwater sensor unit provided on a front window of a vehicle and configured to detect rainwater; a rainwater collection unit configured to collect the rainwater flowing down to under the front window; a water pump unit connected to the rainwater collection unit and configured to discharge the collected rainwater to an air compressor; and an air compressor cooling unit combined with the air compressor and having an inlet flow path and an outlet flow path inside, the discharged rainwater cooling the air compressor while flowing through the inlet flow path and the outlet flow path.

In the compressor cooling system, the water pump unit may operate selectively by driving a wiper.

In the compressor cooling system, a driving speed of the water pump unit may be selectively adjusted according to an amount of the rainwater detected through the rainwater sensor unit and to a time for which the air compressor is driven.

In the compressor cooling system, the rainwater collection unit may collect the rainwater when the rainwater sensor unit detects the rainwater, and the wiper operates.

In the compressor cooling system, the rainwater collection unit may be mounted under a cowl top cover on which a wiper configured to wipe the front window is mounted.

In the compressor cooling system, a connection path connecting an upper portion and a lower portion of the cowl top cover may be provided in the cowl top cover.

In the compressor cooling system, the rainwater collection unit may be mounted under the connection path.

In the compressor cooling system, the connection path may be formed in the shape of a comb or in matrix form.

In the compressor cooling system, the rainwater collection unit may include: a main body having an internal space inside and formed in such a manner that a lower portion thereof is inclined to one side; and a connection tube connected to the water pump unit by being combined with one side of the lower portion of the main body and forming a flow path along which the rainwater collected in the internal space in the main body flows to the water pump unit when the water pump unit is driven.

In the compressor cooling system, the air compressor cooling unit may include: an entrance portion forming the inlet flow path; a circulation portion connected to the entrance portion and forming a circulation flow path for the rainwater flowing through the inlet flow path; and an exit portion connected to the circulation portion and forming the outlet flow path for the rainwater cooling the air compressor while flowing through the circulation flow path.

In the compressor cooling system, the entrance portion, the circulation portion, and the exit portion may be formed, as one module, into the air compressor cooling unit in such a manner as to surround an outer circumferential surface of the air compressor, and the air compressor cooling unit may be detachably combined with the air compressor.

According to the present disclosure, in rainy weather, the water pump operates using the rainwater sensor used to drive the wiper. As described above, when the water pump operates, the air compressor for sensor cleaning is selectively cooled by utilizing the collected rainwater. Thus, the advantageous effect of performing driving control of the water pump by utilizing an existing rainwater sensor without additionally providing a separate sensor for driving the water pump can be achieved.

Therefore, according to the present disclosure, a rainy situation is reflected in real time, and thus the driving of the air compressor can be prevented from being limited due to heat generated by the air compressor. Accordingly, stable cleaning of the surface of the sensor is possible, and the selective driving of the water pump using only the rainwater sensor is possible. Thus, the advantageous effect of minimizing the number of sensors and thus consumption of the electric power can be achieved.

In addition, according to the present disclosure, when the air compressor for sensor cleaning is driven for a long time, the rainwater is utilized as a means of cooling the air compressor without a separate coolant storage tank being provided. Thus, the advantageous effect of simplifying a structure of the air compressor can be achieved.

BRIEF DESCRIPTION OF THE DRAWINGS

The above and other features of the present disclosure is described in detail below with reference to certain examples thereof illustrated in the accompanying drawings which are given herein below by way of illustration only, and thus are not limitative of the present disclosure, and wherein.

DETAILED DESCRIPTION

An embodiment of the present disclosure is described in detail below with reference to the accompanying drawings.

An advantage and a feature of the present disclosure and a method of achieving the advantage and the feature should be apparent from the embodiment that is described below in detail with reference to the accompanying drawings.

However, the present disclosure is not limited to the embodiment that is disclosed below and may be practiced in various different forms. The embodiment is only provided to make a complete disclosure of the present disclosure and to provide a person of ordinary skill in the art to which the present disclosure pertains with definite notice as to the scope of the present disclosure. The scope of the present disclosure should be only defined as in the claims.

In addition, a detailed description of a well-known technology or the like related to the present disclosure, when determined as making the gist and nature of the present disclosure obfuscated, is omitted.

When a component, device, element, or the like of the present disclosure is described as having a purpose or performing an operation, function, or the like, the component, device, or element should be considered herein as being "configured to" meet that purpose or to perform that operation or function.

Figure 1:
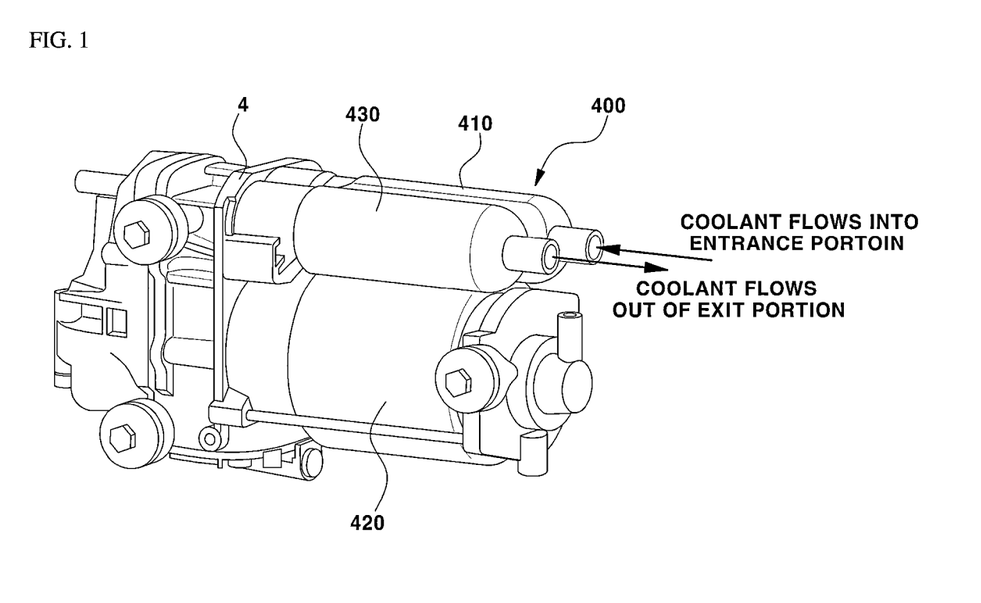
FIG. 1 is a view illustrating an air compressor cooling unit of a compressor cooling system for cleaning a vehicle sensor according to an embodiment of the present disclosure.
Figure 2:
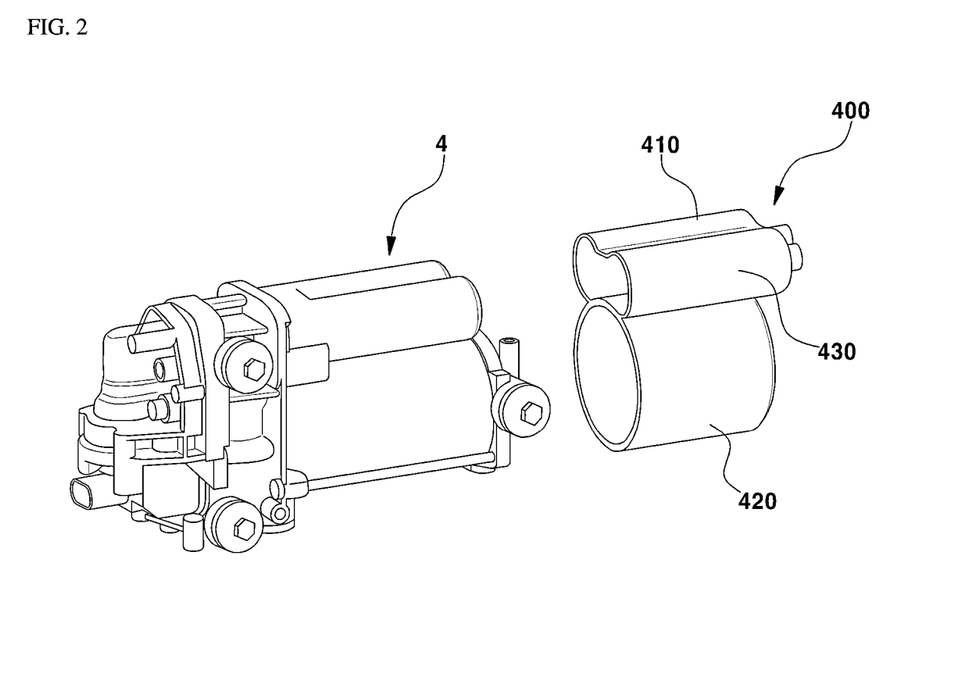
FIG. 2 is a view illustrating a state where the air compressor cooling unit of the compressor cooling system for cleaning a vehicle sensor according to an embodiment of the present disclosure is separated from an air compressor.

FIG. 1 is a view illustrating an air compressor cooling unit of a compressor cooling system for cleaning a vehicle sensor according to an embodiment of the present disclosure. FIG. 2 is a view illustrating a state where the air compressor cooling unit of the compressor cooling system for cleaning a vehicle sensor according to the embodiment of the present disclosure is separated from an air compressor.

Figure 3A:
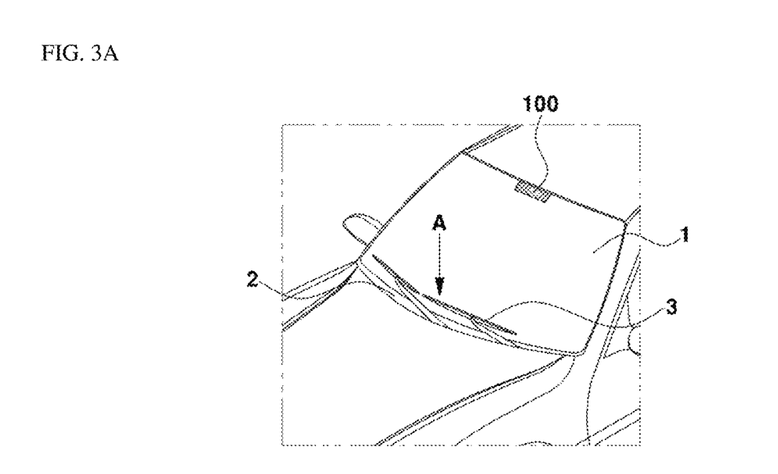
FIGS. 3A and 3B are views illustrating a mounting position of a rainwater collection unit of the compressor cooling system for cleaning a vehicle sensor according to an embodiment of the present disclosure.
Figure 3B:
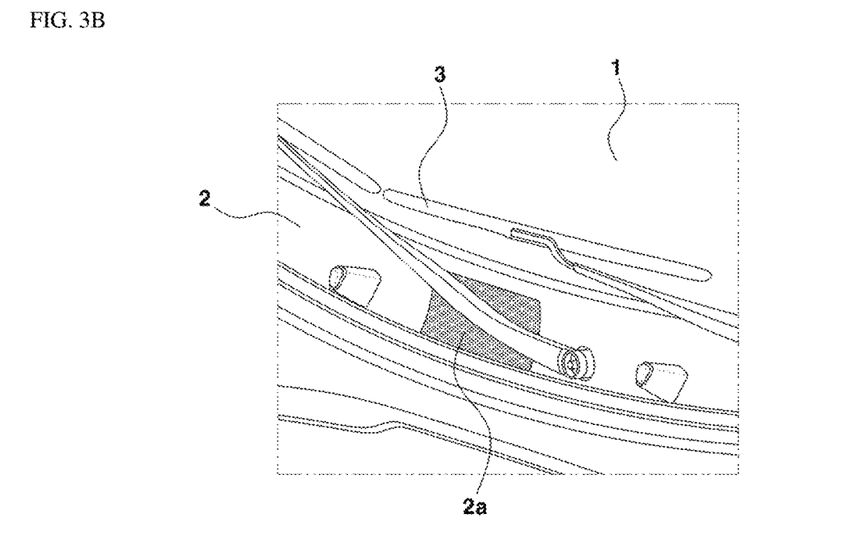
Figure 3C:
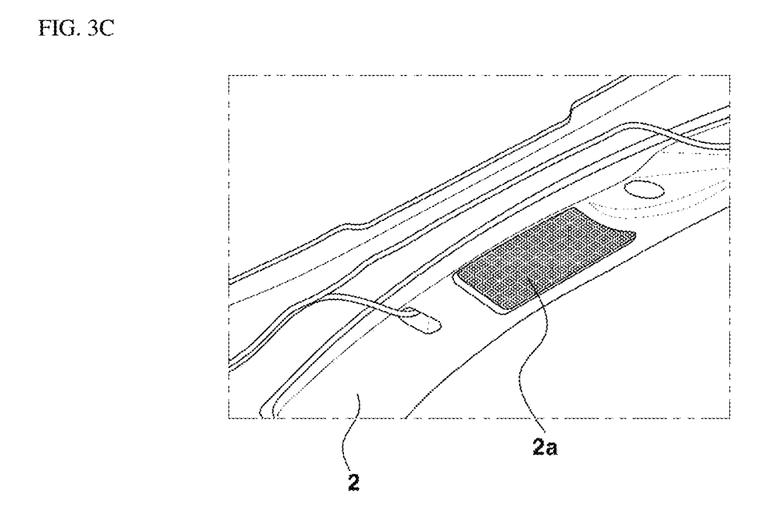
FIG. 3C is a view illustrating a connection path in the compressor cooling system for cleaning a vehicle sensor according to an embodiment of the present disclosure.
Figure 3D:
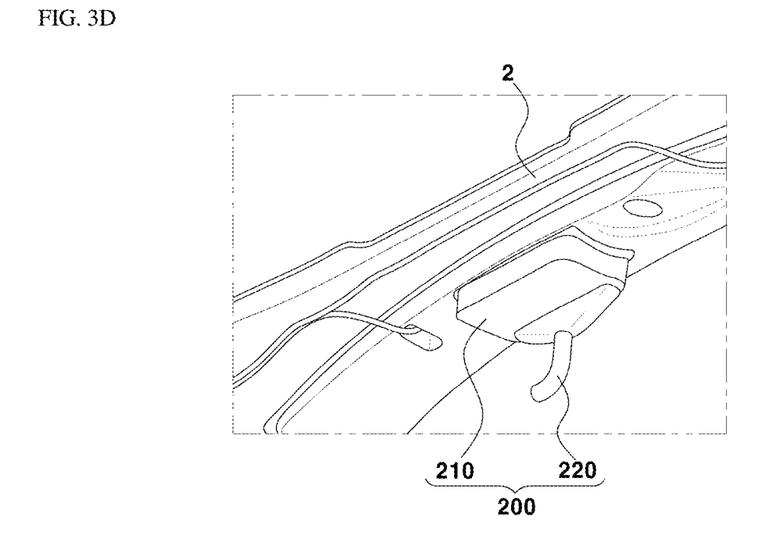
FIG. 3D is a view illustrating a mounted state of the rainwater collection unit of the compressor cooling system for cleaning a vehicle sensor according to an embodiment of the present disclosure.
Figure 4:
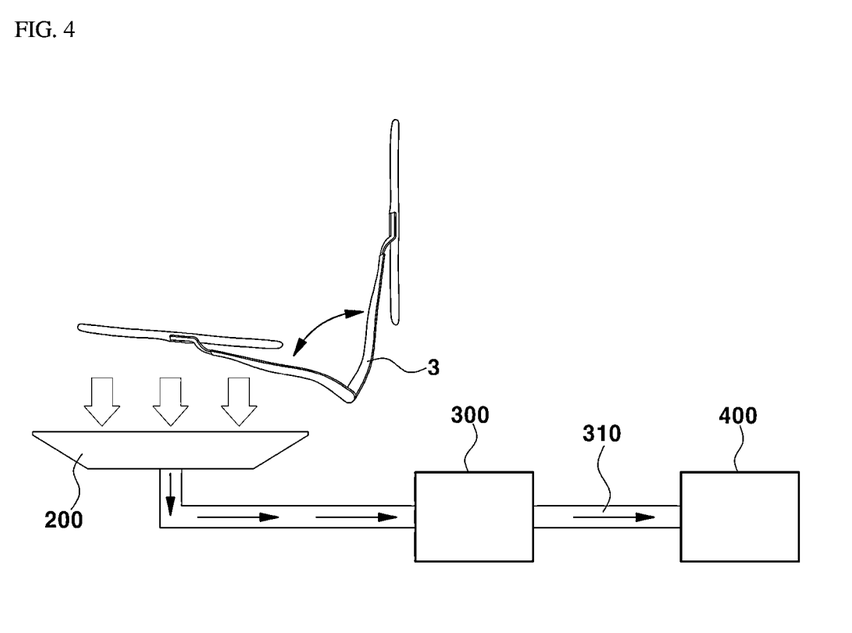
FIG. 4 is a view illustrating a flow of the rainwater in the compressor cooling system for cleaning a vehicle sensor according to an embodiment of the present disclosure.

FIGS. 3A and 3B are views illustrating a mounting position of a rainwater collection unit of the compressor cooling system for cleaning a vehicle sensor according to the embodiment of the present disclosure. FIG. 3C is a view illustrating a connection path in the compressor cooling system for cleaning a vehicle sensor according to the embodiment of the present disclosure. FIG. 3D is a view illustrating a mounted state of the rainwater collection unit of the compressor cooling system for cleaning a vehicle sensor according to the embodiment of the present disclosure. FIG. 4 is a view illustrating a flow of the rainwater in the compressor cooling system for cleaning a vehicle sensor according to the embodiment of the present disclosure.

Normally, situations where a plurality of sensors mounted in vehicles, such as autonomous driving vehicles, are contaminated may include not only a contamination situation caused by dust, but also a contamination situation caused by raindrops in rainy weather.

In the above-mentioned situation where a surface of the sensor is contaminated with the raindrops, there is a need to continuously remove a contamination source through air cleaning. In this case, when an air compressor 4 is driven (i.e., operated) for up to a limited driving time for which the driving thereof is possible, there may occur a problem in that the driving of the air compressor 4 is limited due to an increase in temperature of the air compressor 4.

In order to solve this problem, as illustrated in FIGS. 1-4, the compressor cooling system for cleaning a vehicle sensor according to the present embodiment includes a rainwater sensor unit 100, a rainwater collection unit 200, a water pump unit 300, and an air compressor cooling unit 400.

The rainwater sensor unit 100 is provided on a front window 1 of a vehicle and detects rainwater.

Usually, a wiper 3 that wipes raindrops off an external surface of the front window 1 in rainy weather is provided on the front window 1 (refer to FIG. 3A). Accordingly, a driver in the vehicle may manually control the wiper 3 according to a surrounding environment.

In rainy weather, the driver may change a speed of the wiper 3 using a manually operated switch that is preset to change the speed of the wiper 3 in a stepwise manner. However, the driver needs to manually operate the switch according to the surrounding environment. This manual operation may distract the driver and may even lead to a vehicle accident.

Accordingly, in recent years, the rainwater sensor unit 100 has been required to be provided inside the vehicle. Thus, a size of the raindrop and an amount of the rainwater remaining on the surface of the front window 1 are measured. A driving signal is output to a wiper drive unit, using results of the measurement. A technique of automatically driving the wiper 3 in this manner has been employed.

Desirably, the rainwater sensor unit 100 may detect the rainwater through an optical detection technique. More desirably, a technique of measuring the size of the raindrop and the amount of the rainwater may be employed.

When the rainwater is detected by the rainwater sensor unit 100, and thus the wiper 3 operates, the rainwater collection unit 200 collects the rainwater flowing down to under the front window 1.

As illustrated in FIG. 3B (the drawing resulting from enlarging portion A of FIG. 3A), the rainwater collection unit 200 is mounted under a cowl top cover 2 on which the wiper 3 is positioned. Accordingly, when the wiper 3 operates, the rainwater flowing down from the front window 1 may flow toward an inclined center portion of the cowl top cover 2, may flow therethrough, and may be collected in the rainwater collection unit 200.

In other words, the rainwater collection unit 200 serves to collect the rainwater flowing in the upward and downward direction when the wiper 3 operates. Specifically, the rainwater collection unit 200 is mounted under the cowl top cover 2, i.e., under a connection path 2a connecting upper and lower portions of the cowl top cover 2 exposed to the outside at the cowl top cover 2. More desirably, the connection path 2a, as illustrated in FIG. 3C, may be formed in the shape of a comb or in matrix form in order to prevent a large amount of the rainwater from being introduced at one time into the rainwater collection unit 200.

The rainwater collection unit 200, as illustrated in FIG. 3D, includes a main body 210 and a connection tube 220.

An internal space having a predetermined size is formed inside the main body 210. The main body 210 may be formed in such a manner that a lower portion thereof is inclined to one side.

Accordingly, when introduced into the center portion of the cowl top cover 2, the rainwater is collected in the internal space in the main body 210. In other words, the rainwater flows along the inclined portion of the main body 210 and thus flows to one side.

In addition, the connection tube 220 is integrally combined with the main body 210 at the lower portion thereof in such a manner as to have a predetermined length and is connected to a water pump unit 300.

The connection tube 220 forms a flow path along which the rainwater collected in the internal space in the main body 210 flows to the water pump unit 300 when the water pump unit 300 is driven (i.e., operated).

The water pump unit 300, as described above, is connected to the rainwater collection unit 200, and selectively operates when the wiper 3 is driven.

Accordingly, when operating by the driving of the wiper 3, the water pump unit 300, as described in FIG. 4, discharges the rainwater collected in the rainwater collection unit 200, along a direction indicated by an arrow, to the air compressor cooling unit 400.

The water pump unit 300 is configured in such a manner that a driving speed thereof is selectively adjusted according to an amount of the rainwater detected through the rainwater sensor unit 100 and to a time for which the air compressor 4 is driven.

In other words, through reiterated experiments and evaluations thereof, a control logic for the driving speed of the water pump unit 300 may be configured using a compensation coefficient α corresponding to a correlation between contamination with the surface of the sensor due to the rainwater and the time for which the air compressor 4 is continuously driven to remove a contaminant on the surface of the senser. As an example, the control logic, such as "an operating speed of the water pump unit 300=α (the compensation coefficient)×the amount of the rainwater detected by the rainwater sensor unit 100" may be configured. With this control logic, the driving speed of the water pump unit 300 may be controlled.

Therefore, according to the present disclosure, without additionally providing a separate sensor for controlling the driving speed of the water pump unit 300, the driving speed of the water pump unit 300 may be selectively controlled using the amount of the rainwater detected through the rainwater sensor unit 100 mounted on the vehicle, or using a combination of the amount of the rainwater detected and the time for which the air compressor 4 is continuously driven. Thus, the consumption of electric power for driving an additional sensor can be minimized.

The air compressor cooling unit 400, as illustrated in FIGS. 1 and 2, is combined with the air compressor 4 and has both an inlet flow path and an outlet flow path. When the water pump unit 300 is driven, the discharged rainwater cools the air compressor 4 while flowing through the inlet flow path and the outlet flow path.

To this end, the air compressor cooling unit 400 may include an entrance portion 410, a circulation portion 420, and an exit portion 430.

First, the entrance portion 410, although not illustrated in the drawings, has an inlet flow path in the shape of an ordinary pipe inside. This inlet flow path is connected to a tube 310 extending from an outlet port of the water pump unit 300 (refer to FIG. 4).

In addition, the circulation portion 420 is formed to have the same structure as the entrance portion 410 and is connected to the entrance portion 410. Accordingly, a circulation flow path for the rainwater flowing through the inlet flow path is formed. Consequently, the flow discharged by the water pump unit 300 may flow along the entrance portion 410 and the circulation portion 420.

Moreover, the exit portion 430 has the same structure as the entrance portion 410 and the circulation portion 420 and is connected to the circulation portion 420. The exit portion 430 forms the outlet flow path for the rainwater cooling the air compressor 4 while flowing through the circulation flow path.

The air compressor cooling unit 400 is mounted in such a manner as to surround an outer circumferential surface of the air compressor 4 (refer to FIG. 1).

The entrance portion 410, the circulation portion 420, and the exit portion 430 may be formed, as one module, into the air compressor cooling unit 400 (refer to FIG. 2).

It is also possible that the air compressor cooling unit 400 is detachably attached to the air compressor 4. Accordingly, when the air compressor 4 is driven for a long time for sensor cleaning, the air compressor cooling unit 400 can be easily replaced when it is determined that cooling performance of the air compressor cooling unit 400 is decreased. Thus, the effective maintenance of the air compressor cooling unit 400 is possible.

Along with this, according to the present embodiment, without providing a separate coolant storage tank for cooling the air compressor 4, the rainwater is collected through the rainwater collection unit 200, and the cooling is performed using the collected rainwater. Consequently, not only is structural simplification of the air compressor 4 possible, but reduction of a weight thereof is also possible.

According to the present disclosure, in rainy weather, the water pump operates using the rainwater sensor used to drive the wiper. As described above, when the water pump operates, the air compressor for sensor cleaning is selectively cooled by utilizing the collected rainwater. Thus, the advantageous effect of performing driving control of the water pump by utilizing an existing rainwater sensor without additionally providing a separate sensor for driving the water pump can be achieved.

Therefore, according to the present disclosure, the driving of the air compressor can be prevented from being limited due to heat generated by the air compressor. Accordingly, stable cleaning of the surface of the sensor is possible, and the selective driving of the water pump using only the rainwater sensor is possible. Thus, the advantageous effect of minimizing the number of sensors and thus consumption of the electric power can be achieved.

In addition, according to the present disclosure, when the air compressor for sensor cleaning is driven for a long time, the rainwater is utilized as a means of cooling the air compressor without a separate coolant storage tank being provided. Thus, the advantageous effect of making a structure of the air compressor simplified can be achieved.

The embodiment of the present disclosure is described above only in a representative manner with reference to the drawings. It would be understandable to a person of ordinary skill in the art to which the present disclosure pertains that various modifications can be made to the embodiment and that embodiments resulting from the modifications can be configured to be selectively combined. The legitimate technical scope of the present disclosure should be determined by the technical idea that is defined in the following claims.

What is claimed is:

1. A compressor cooling system for cleaning a vehicle sensor, the system comprising:
   a rainwater sensor unit provided on a front window of a vehicle and configured to detect rainwater;
   a rainwater collection unit configured to collect the rainwater flowing down to under the front window;
   a water pump unit connected to the rainwater collection unit and configured to discharge the collected rainwater to an air compressor; and
   an air compressor cooling unit combined with the air compressor and having an inlet flow path and an outlet flow path inside, the discharged rainwater cooling the air compressor while flowing through the inlet flow path and the outlet flow path.

2. The compressor cooling system of claim 1, wherein the water pump unit operates selectively by driving a wiper.

3. The compressor cooling system of claim 1, wherein a driving speed of the water pump unit is selectively adjusted according to an amount of the rainwater detected through the rainwater sensor unit and to a time for which the air compressor is driven.

4. The compressor cooling system of claim 1, wherein the rainwater collection unit collects the rainwater when the rainwater sensor unit detects the rainwater, and the wiper operates.

5. The compressor cooling system of claim 1, wherein the rainwater collection unit is mounted under a cowl top cover on which a wiper configured to wipe the front window is mounted.

6. The compressor cooling system of claim 5, wherein a connection path connecting an upper portion and a lower portion of the cowl top cover is provided in the cowl top cover.

7. The compressor cooling system of claim 6, wherein the rainwater collection unit is mounted under the connection path.

8. The compressor cooling system of claim 6, wherein the connection path is formed in the shape of a comb or in matrix form.

9. The compressor cooling system of claim 1, wherein the rainwater collection unit comprises:
   a main body having an internal space inside and formed in such a manner that a lower portion thereof is inclined to one side; and
   a connection tube connected to the water pump unit by being combined with one side of the lower portion of the main body and forming a flow path along which the rainwater collected in the internal space in the main body flows to the water pump unit when the water pump unit is driven.

10. The compressor cooling system of claim 1, wherein the air compressor cooling unit comprises:
    an entrance portion forming the inlet flow path;
    a circulation portion connected to the entrance portion and forming a circulation flow path for the rainwater flowing through the inlet flow path; and
    an exit portion connected to the circulation portion and forming the outlet flow path for the rainwater cooling the air compressor while flowing through the circulation flow path.

11. The compressor cooling system of claim 10, wherein the entrance portion, the circulation portion, and the exit portion are formed, as one module, into the air compressor cooling unit in such a manner as to surround an outer circumferential surface of the air compressor, and the air compressor cooling unit is detachably combined with the air compressor.

\* \* \* \* \*